(12) United States Patent
Allford et al.

(10) Patent No.: US 7,131,815 B2
(45) Date of Patent: Nov. 7, 2006

(54) INLET GUIDE VANE

(75) Inventors: Peter Allford, Bristol (GB); Gary Olds, Derby (GB)

(73) Assignee: Rolls-Royce PLC, London (GB)

( * ) Notice: Subject to any disclaimer, the term of this patent is extended or adjusted under 35 U.S.C. 154(b) by 211 days.

(21) Appl. No.: 10/876,571

(22) Filed: Jun. 28, 2004

(65) Prior Publication Data

US 2005/0008482 A1  Jan. 13, 2005

(30) Foreign Application Priority Data

Jul. 11, 2003 (GB) .................................... 0316257
May 12, 2004 (GB) .................................... 0410685

(51) Int. Cl.
F01D 17/16 (2006.01)
F01D 25/02 (2006.01)

(52) U.S. Cl. ............... 415/160; 415/175; 415/177; 60/39.093; 219/530; 219/541

(58) Field of Classification Search ............... 415/151, 415/159–162, 175–178; 416/39, 95, 142–143, 416/146 R; 60/39.093, 794; 244/134 D; 392/347, 360, 362–363, 365–369, 374; 219/530, 219/541
See application file for complete search history.

(56) References Cited

U.S. PATENT DOCUMENTS 2,402,770 A * 6/1946 Poekel .................. 244/134 D
2,695,146 A * 11/1954 De Witt .................. 244/134 D
2,742,248 A * 4/1956 Le Compte et al. .... 244/134 D
3,042,346 A   7/1962 Hawley
4,695,220 A * 9/1987 Dawson ...................... 415/160
5,020,741 A   6/1991 Ziegler et al.
5,131,812 A * 7/1992 Boyd et al. .................... 416/95
5,174,717 A   12/1992 Moore
5,281,091 A   1/1994 Dooley et al.
6,447,249 B1  9/2002 Potdevin
6,481,965 B1  11/2002 Certain et al.

FOREIGN PATENT DOCUMENTS

GB  681186  10/1952
GB  698774  10/1953
GB  710019  6/1954

* cited by examiner

*Primary Examiner*—Christopher Verdier
(74) *Attorney, Agent, or Firm*—Oliff & Berridge, PLC

(57) ABSTRACT

A vane provided with at least one spindle, the at least one spindle configured to engage in operation with a support such that in operation the vane pivots about the at least one spindle. The vane is further provided with an electrically operable heater which is communicable with an electrical supply via an electrical connection node located in the at least one spindle. The electrical connection node comprises a female portion and a corresponding male portion. The support is defined by a casing.

10 Claims, 3 Drawing Sheets

INLET GUIDE VANE

The invention relates to an inlet guide vane.

In particular the invention relates to an inlet guide vane comprising a means for connecting an electrically operable heater to an electrical supply.

In a conventional gas turbine engine a fan is used for pressurising ambient air which is then passed downstream to a compressor to be further compressed. The air is then mixed with fuel in a combustor, ignited and burned to expand the gas, increasing the gas temperature. Energy is extracted from the gas by passing it through a turbine prior to being exhausted. The engine may have a high pressure turbine which powers the compressor and a low pressure turbine which powers the fan.

Other engines utilise power off takes, perhaps directly from one of the turbine stages, to drive independent fans to generate propulsive thrust remote from the propulsion unit.

The rotatable sections of an engine typically comprise annular arrays of large fan blade rotors and smaller compressor and turbine rotor blades, the blades normally being intersected with annular arrays of static aerodynamic guide vanes (commonly referred to as stator vanes). Each set of rotor blades and stator vanes is referred to as a stage. The stator vanes ensure the gas impinges on the rotor at the correct angle. The whole assembly is contained within a fan casing.

Variable inlet guide vanes (that is guide vanes with which it is possible to change the pitch of during operation of the fan unit) are employed upstream of the fan to ensure gas enters the fan at the optimum angle. A variable pitch blade is desirable as the efficiency of the rotor, which is of fixed pitch, can be optimised at different rotational speeds by altering the angle which gas approaches the rotating blade.

Variable inlet guide vanes conventionally pivot about spindles provided at both ends of the vane. The vanes are connected to a lever which is pivotably attached to a unison ring mounted around the periphery of the fan casing. The unison ring is moved circumferentially by small incremental amounts by a hydraulic ram, operable by some suitable means. Hence the pitch of the vane may be altered by operating the hydraulic ram.

A common problem is ice formation on variable and static inlet guide vanes. Ice poses a number of hazards. In particular ice will alter the aerodynamic shape of the vane, hence altering the angle at which air is angled as it passes over the vane.

On static vanes this problem is addressed by heating the inlet guide vane either by ducting hot air from a high pressure compressor stage or providing electrical heaters on the vanes, both means intended to melt the ice.

In situations where the fan is remote from the main propulsive unit it may be not practical to duct air from a source of hot air to the guide vane as doing so may add undesirable complexity and weight to the aircraft structure.

Electrical heaters have been commonly employed on variable/moveable propeller blades (for example, helicopter blades) and static vanes where access to repair and maintain an electrical connection is relatively straightforward.

A variable inlet guide vane poses the problem of how to supply an electric current to a heater which is mounted on a moveable object constrained within a casing. The surface of the guide vane must be kept free of electrical connections in order to ensure optimum aerodynamic performance of the vane. Also, since a variable inlet guide vane is mounted inside an aircraft structure it must be constructed such that electrical components are sufficiently protected from contamination and/or damage thereby reducing the likelihood of maintenance and/or repair. Additionally it is required to have a simple connection as it may be required to replace the vane and hence disconnect the supply from an old vane and reconnect it to a new vane.

This has been achieved on some variable/moveable propeller blades by forming an electrical connection between slip rings and brushes mounted on the vane spindle. This allows for relative movement between the supply cables and the moveable vane as it pivots in operation.

However such a means has significant demerit in that it can only be used in low voltage applications, as the spacing between the slip rings and brushes are, through physical necessity, quite small. The electrical connection is typically in a region which may suffer contamination (dust, oil, water) and which will assist in short circuiting the heater circuit and reducing its reliability. Additionally slip ring and brush assemblies require maintenance to keep the electrically conductive surfaces clean, and hence operating optimally.

Hence it is required to provide a consistently good electrical connection in order to supply an electrical heater mounted on a variable inlet guide vane.

According to the present invention there is provided an inlet guide vane assembly comprising an inlet guide vane, an electrically operable heater communicable with an electrical supply and an electrical connection node and at least one spindle for pivotably mounting the vane wherein at least one spindle is provided with a continuous annular bearing and a cavity within the or each spindle bounded by the annular bearing, the or each spindle configured to engage with and be pivotable about a support means, and said heater is communicable with the electrical supply via the electrical connection node mounted within the or each spindle cavity.

Preferably the electrical connection node comprises a female portion and a corresponding male portion.

Preferably the support means is defined by a casing.

The invention is a compressor comprising a variable inlet guide vane provided with an electrically operable heater with a means for connecting the heater to an electrical supply which overcomes the deficiencies of the prior art.

The invention comprises an arrangement for an internally fitted electrical connector, fitted into a spindle of a variable inlet guide vane, which acts as a terminal connector or node in a circuit for supplying electricity to electrically operable heater mats for the purpose of ice protection. The connector is of a suitable moulded plastic material.

The advantage of this arrangement is that the electrical connection for the heater mats on each vane is simple to detach and re-attach. Also each vane may be treated as a complete sub assembly that can be easily removed and replaced without any special tools to make a connection between the electrical supply and the electric heaters. The invention may also be used in a high voltage application and where a high degree of environmental contamination is expected.

Locating the electrical connection node in the spindle of the vane also ensures the aerodynamic surface of the vane and bearing surface of the spindle are kept free of electrical connections hence ensuring optimum performance of the component, as well as reducing the possibility of damage to the electrical components.

The invention and how it may be put into practice will now be described with reference to the embodiment illustrated in the accompanying drawings, in which.

Figure 1:
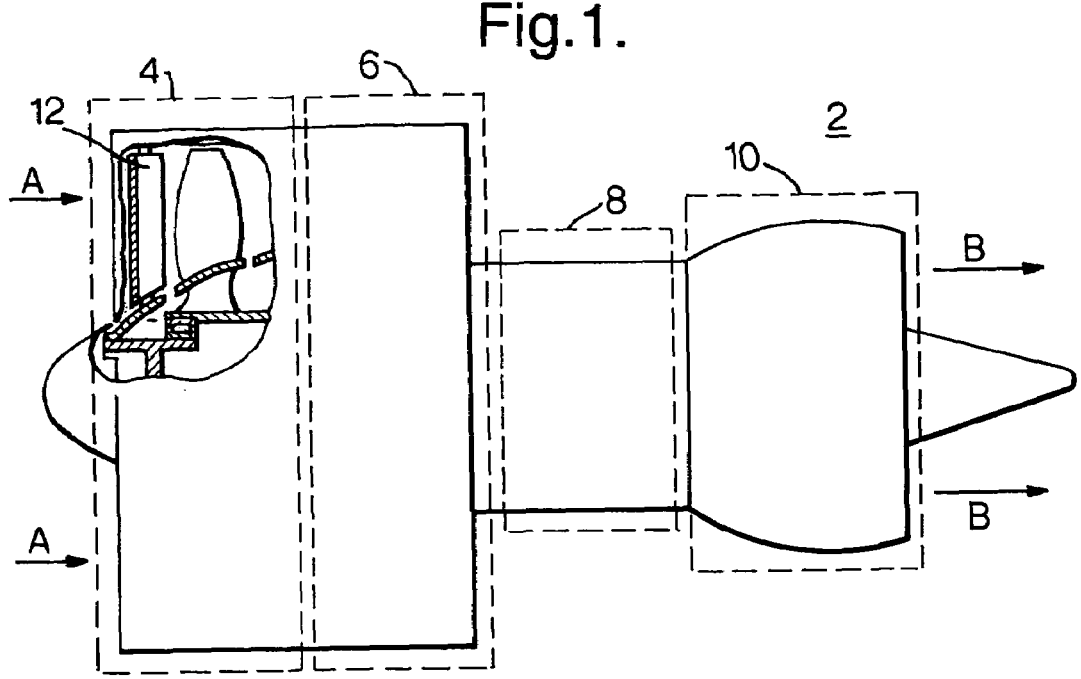
FIG. 1 is a pictorial representation of a gas turbine engine comprising a compressor unit according to the present invention.

FIG. 1 illustrates the main sections of a gas turbine engine 2. The overall construction and operation of the engine 2 is of a conventional kind, well known in the field, and will not be described in this specification beyond that necessary to gain an understanding of the invention. For the purposes of this description the engine is divided up into four sections—a compressor unit comprising a fan section 4 and a compressor section 6, a combustor section 8 and a turbine section 10. Air, indicated generally by arrow "A", enters the engine 2 via the fan section 4 and passes over a variable inlet guide vane 12 before being compressed by the fan 4 and moving downstream to the compressor 6. This further pressurises the air, a proportion of which enters the combustion section 8, the remainder of the air being employed elsewhere. Fuel is injected into the combustor airflow, which mixes with air and ignites before exhausting out of the rear of the engine, indicated generally by arrow "B", via the turbine section 10.

Figure 2:
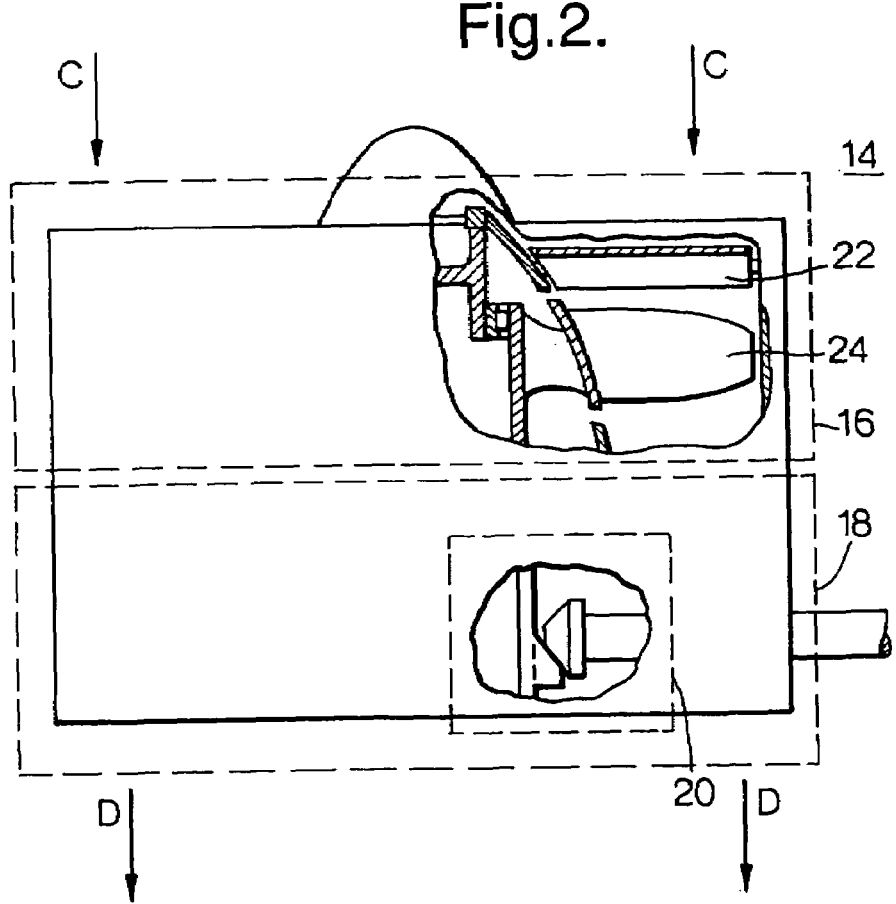
FIG. 2 is a pictorial representation of a remotely powered compressor unit in accordance with the present invention.

FIG. 2 illustrates a fan unit 14 that is driven remotely from an engine. It does not provide compressed air to the engine but is used to generate propulsive thrust remote from the propulsion unit. In FIG. 2 the fan unit 14 is shown mounted with its central axis vertical. This is only one embodiment, drawn here for illustrative purposes. The fan unit may be mounted in any orientation.

For the purposes of this description the fan unit 14 is divided up into 3 sections—a compressor unit comprising a fan rotor section 16 and a compressor section 18 and a drive shaft and gearing arrangement 20, the latter being shown in a cutaway view. Air, indicated generally by arrow "C", enters the fan unit 14 and passes over a variable inlet guide vane 22 before being compressed by the fan rotor section 16. A cutaway section reveals the location of a variable inlet guide vane 22 at the entry to the fan rotor section 16. The air is compressed by the fan rotor 24 and moves downstream to the compressor section 18, where it is further pressurised before being exhausted from the fan 14, indicated generally by arrow "D".

Figure 3:
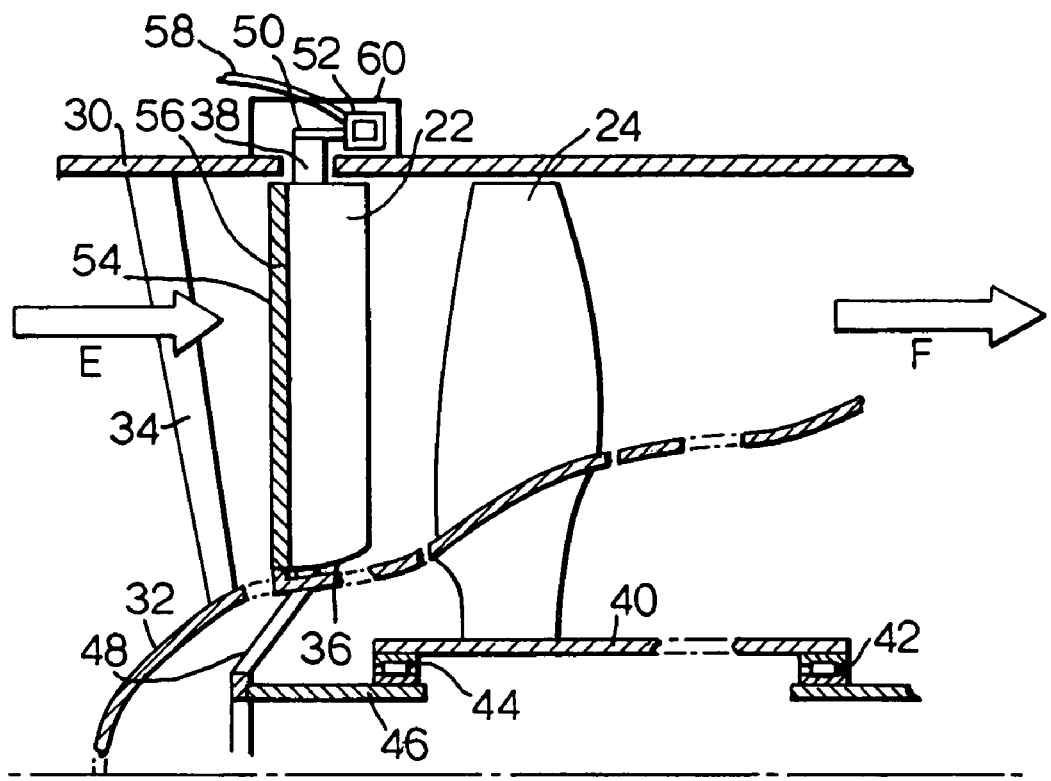
FIG. 3 shows an enlarged view of a variable inlet guide vane as shown in FIG. 1 and FIG. 2.

An enlarged view of the fan assembly common to the engine 2 and fan unit 14 is presented in FIG. 3. Air, indicated generally by arrow "E", enters the fan unit 14, constrained on one side by an outer wall 30 (or casing) and on the other by a discontinuous inner wall 32 (or casing). Support for the inner wall 32 is provided by an array of support members 34 which extend radially towards, and are in communication with, the outer wall 30. Moving downstream of the support members 34, an array of variable inlet guide vanes 22 is mounted such that the vanes extend radially out from the inner wall 32 towards, and are communication with, the outer wall 30. Each of the variable inlet guide vanes 22 is provided with an inner spindle 36 and an outer spindle 38 which locate in the inner wall 32 and the outer wall 30 respectively. The inner wall 32 and the outer wall 30 act as support means for the variable inlet guide vanes 22. The inner wall 32 comprises several static and rotatable sections, the details of which are not required here to appreciate the invention. The air is pressurised by an annular array of fan rotor blades 24 and then passes downstream, as indicated generally by arrow "F".

The fan blades 24 are fixedly joined to a shaft 40 that is rotatable about the central axis of the fan unit 14. The shaft 40 is rotatably supported by bearings 42 and 44 at the downstream and upstream ends respectively. The bearing 44 is supported by a non-rotatable support structure 46 which is in communication with a non-rotatable section of the inner wall 32 via a static member 48.

The outer spindle 38 is fixed to a lever 50 which is pivotably mounted on a unison ring 52 that extends around the outer circumference of the outer casing 30. The unison ring 52 is actuated by some suitable means (not shown) and, in operation rotates circumferentially thereby pivoting the variable inlet guide vane 22.

The variable inlet guide vane 22 is provided with an electrical heater 54 which extends substantially along the leading edge 56 of the vane 22. Wires 58 connecting the electrical heater 54 to an electrical supply (not shown) exit the vane 22 via the spindle 38. A protective cover 60 may be mounted on the outer casing 30 to protect the spindle 38 and actuating ring 52.

Figure 4:
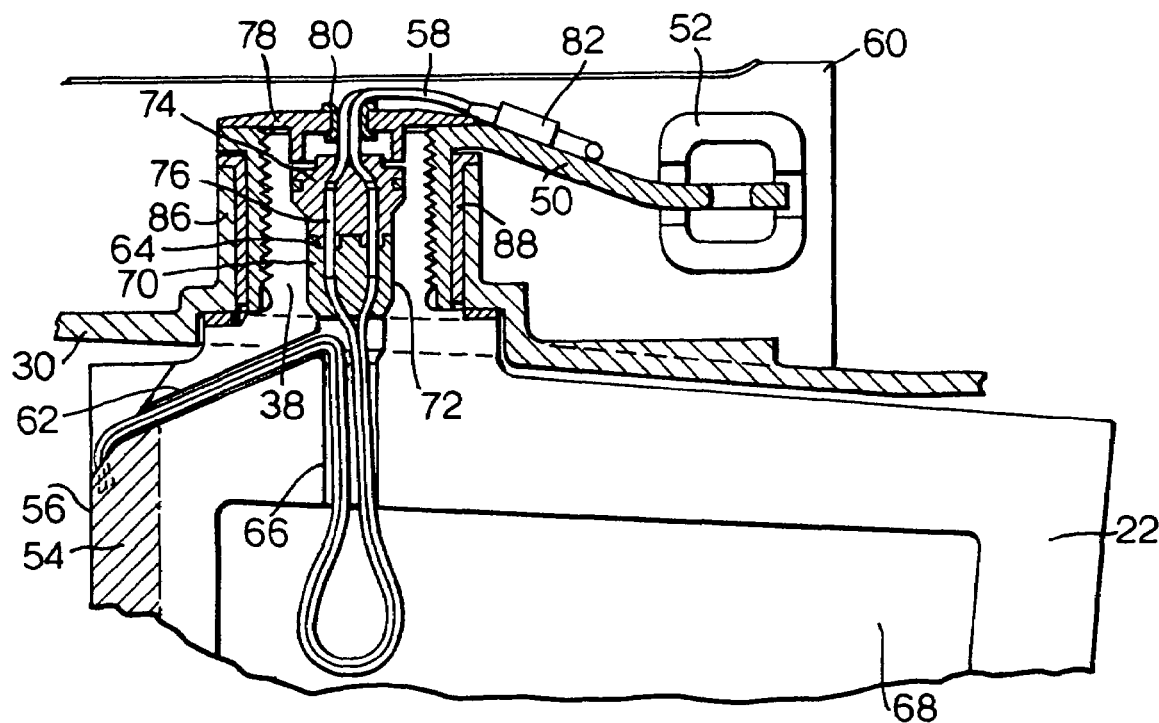
FIG. 4 shows an enlarged view of a spindle and connection node mounted in the variable guide vane as shown in FIG. 3.
Figure 5:
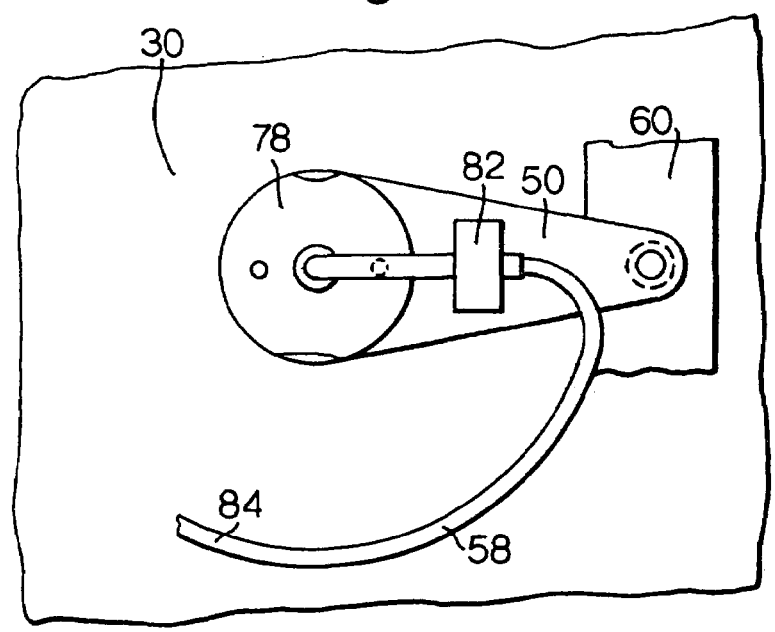
FIG. 5 shows a plan view of the connection node as shown in FIG. 4.

An enlarged cross sectional view of the spindle 38 is presented in FIG. 4, and a plan view of the same region is presented in FIG. 5.

The leading edge 56 of the vane 22 is provided with a heater mat 54. Wires 58 connecting the electric heater 54 to an electrical supply run from the electric heater 54 via a first passage 62 to an electrical connection node 64 mounted in the spindle 38. Excess wire 58 length may be accommodated by drilling a second passage 66 to a hollow cavity 68 formed as part of the vane 22 structure. The heater wires 58 terminate into a male portion 70 of the electrical connection node 64 which is bonded into position within a cavity 72 formed within the spindle 38. A female portion 74 of the electrical connection node 64 locates in the spindle cavity 72 to correctly align with electrical contact pins 76 in the male portion 70 and thereby complete the electrical connection. A spindle end cap 78 is provided on the end of the spindle 38, and is formed with a hole 80 through which the wires 58 pass. The wires 58 are attached to the lever 50 by a clip or clamp 82 before leaving a free end 84 to connect with an electrical supply.

The lever 50 comprises a portion shaped to surround the periphery of the spindle 38, and is located on the spindle 38 by axial splines of suitable length and retained in position by the spindle end cap 78. The lever 50 is located in a support means 86 defined by the casing 30 via a bush 88 which extends around the periphery of the spindle 38, thereby locating the spindle 38 and permitting rotation of the variable vane 22 relative to the casing 30.

Figure 6:
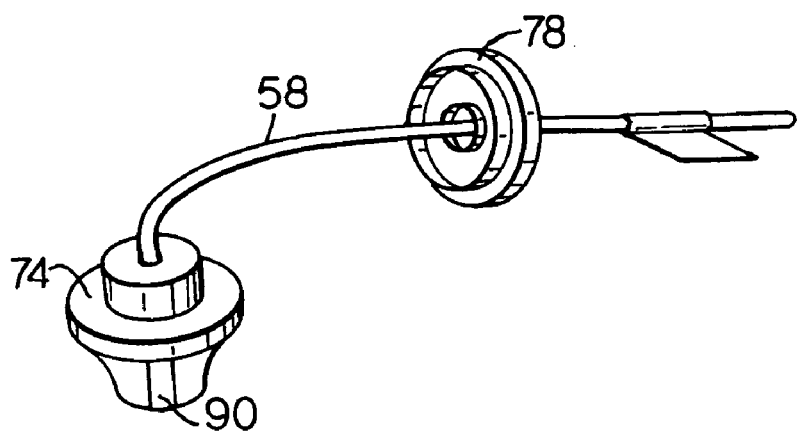
FIG. 6 shows a detailed view of a socket, clamp and cap which comprise the female portion of the connection node in accordance with the present invention and as shown in FIG. 4.

Referring now to FIG. 6, the female portion 74 the electrical connector 64 is provided with an axial key 90 to enable correct orientation of the female portion 74 with the male portion 70 which is formed with a corresponding channel (not shown).

This configuration allows the male portion 70 and the female portion 74 of the electrical connector 64 to be easily engaged and disengaged. In order to engage the portions 70,74 the axial key 90 is orientated with the corresponding channel in the male portion 70 and then the female portion 74 is pressed into the male portion 70. The end cap 78 is fixed in position which may be a press or screw fit. The end cap 78 prevents moisture and dust from entering the cavity 72 in the spindle 38 and hence protects the electrical connector 64 from corrosion or damage. Additionally the end cap 78 will prevent the female portion 74 from vibrating free of the male portion 70 during excessive or prolonged exposure to vibration, thereby preserving the connection to the electrical supply.

In operation the actuating ring 60 moves circumferentially backwards and forwards around the outside of the casing 30, thereby moving the lever 50 and vane 22, causing the wire 58 to flex relative to the lever 50. The wire 58 is of suitable construction and lifed appropriately such that it will not be fatigued by this relative motion.

The electrical heater may be formed integrally with the vane.

The electrical heater may be operable at about 270 volts.

The configurations shown in the accompanying figures are diagrammatic. The design of the elements comprising the invention may vary between designs. Likewise the configurations and relative positioning of the described components may differ in different embodiments of the invention.

The invention claimed is:

1. An inlet guide vane assembly comprising an inlet guide vane, an electrically operable heater communicable with an electrical supply and an electrical connection node and at least one spindle for pivotably mounting the vane wherein at least one spindle is provided with a continuous annular bearing and a cavity within the or each spindle bounded by the annular bearing, the or each spindle configured to engage with and be pivotable about a support means, and said heater is communicable with the electrical supply via the electrical connection node mounted within the or each spindle cavity.

2. A vane assembly as claimed in claim 1 wherein the electrical connection node comprises a female portion and a corresponding male portion.

3. A vane assembly as claimed in claim 1 wherein the support means is defined by a casing.

4. A vane assembly as claimed in claim 1 wherein a spindle is provided at longitudinal extents of the vane.

5. A vane assembly as claimed in claim 1 wherein the electrical heater is operable at high voltage.

6. A vane assembly as claimed in claim 1 wherein the electrical heater is operable at about 270 volts.

7. A vane assembly as claimed in claim 1 wherein the electrical heater is formed integrally with the vane.

8. A vane assembly as claimed in claim 1 wherein the electrical heater is provided substantially along one edge of the vane.

9. A vane assembly as claimed in claim 1 wherein said vane comprises part of a compressor for a gas turbine engine or a compressor driven remotely from an engine.

10. A vane assembly as claimed in claim 1 wherein said vane is a variable inlet guide vane for a compressor for a gas turbine engine or a compressor driven remotely from an engine.

* * * * *